United States Patent [19]

Dahlgren

[11] Patent Number: 5,170,450
[45] Date of Patent: Dec. 8, 1992

[54] DUAL-CORE FIBER LAUNCHING COUPLER

[75] Inventor: Robert P. Dahlgren, Somerville, Mass.

[73] Assignee: The Charles Stark Draper Laboratory, Inc., Cambridge, Mass.

[21] Appl. No.: 679,798

[22] Filed: Apr. 3, 1991

[51] Int. Cl.$^5$ .............................................. G02B 6/26
[52] U.S. Cl. ...................................... 385/43; 385/42
[58] Field of Search ...................... 350/96.15, 96.20; 385/15, 31, 42, 43, 30, 39, 125, 126

[56] References Cited

U.S. PATENT DOCUMENTS

| | | | |
|---|---|---|---|
| 4,315,666 | 2/1982 | Hicks, Jr. | 350/96.15 |
| 4,669,814 | 6/1987 | Dyott | 350/96.15 |
| 4,676,583 | 6/1987 | Hicks, Jr. | 350/96.15 |
| 5,013,117 | 5/1991 | Fukuma | 350/96.15 |

OTHER PUBLICATIONS

S. B. Poole & J. D. Love, "Single-Core Fibre to Twin-Core Fibre Connector", Electronics Letters, vol. 27, No. 17, pp. 1559-1560 (15 Aug. 1990).

Primary Examiner—John D. Lee
Assistant Examiner—Phan T. Heartney
Attorney, Agent, or Firm—Lahive & Cockfield

[57] ABSTRACT

A fiber optic coupler and method of manufacture of same in which a single core optical fiber is twisted about a dual core optical fiber and is heated to softening while drawing the melted junction out to form a biconical taper for providing a controlled splitting ratio for light from the single optical fiber into the dual core fiber. In another embodiment two single core fibers are fused to form a dual core fiber without coupling between the cores.

11 Claims, 2 Drawing Sheets

DUAL-CORE FIBER LAUNCHING COUPLER

FIELD OF THE INVENTION

This invention relates in general single-mode fiber optic couplers and more particularly to fiber optic sensors including a coupler for coupling light from a single core optical fiber into a dual-core optical fiber.

BACKGROUND OF THE INVENTION

Fiber optic sensors employing dual-core fibers have a number of uses in such devices as smark skins, hydrophones, magnetometers, alignment determination and interferometric sensors. In a typical dual-core cross section a pair of single-mode cores are located within the cladding at positions nominally equidistant from the central axis of the fiber. There are many applications, such as interferometric sensors in which it is required that light be launched into both cores simultaneously and that phase information be retrieved from these cores. Because of the non-symmetrical geometry, the alignment required for accomplishing this is difficult. In the prior art this has been accomplished employing bulk optics, such as converging lens and precision 3-axis positioning stage. However, since the bulk optics are unstable, large in size and expensive, their usefulness is limited to instruments constructed as laboratory prototypes and they are unsuitable for many practical sensors, particularly where size and expense factors require that the entire device be fabricated from optical fibers. Thus the requirement for bulk optical components has ruled out the use of the dual-core fiber sensors in small, inexpensive applications.

This non-rotationally symmetric aspect of dual-core fibers makes it substantially impossible to splioe or connect them to a single core/single mode fiber, since highly accurate core to cladding concentricity (typically less than 1 micron) is required. Since diode lasers, light emitting diodes, integrated optics and photodetectors are now available with a fiber pigtailed configuration, the ability to splice this pigtail with low losses into dual-core fibers is highly desirable.

SUMMARY OF THE INVENTION

Broadly speaking, in this invention a single core fiber and a dual-core fiber form a fused coupler, by twisting together the pair of fibers, heating them to their softening point and drawing the fibers out to form a biconical taper. The tapering of the fiber reduces the diameter of the cores. The changing boundary conditions causes the lowest order Gaussian mode to expand with respect to the core diameter. In the narrowest portion of this fused coupler each of the cores are placed in close proximity. The expansion of the Gaussian mode field diameter because of the tapering, and the closeness of the cores permits optical coupling to occur in this region. Adjustment of the length of the taper and the diameter of the taper can be used to control the splitting ratio between the three fibers. Using this configuration virtually 100% of the light from the single core fiber can be coupled into the dual-core fiber with the split between each of the dual cores being controlled by the length and diameter of the taper. Because of the single core input, pigtailed components, such as laser sources, photodetectors and integrated optics can be coupled to a dual-core sensing fiber. The coupler may be packaged in standard packaging, currently used for single-core fiber optic fused couplers providing for stability, reliability and ruggedness.

A similar fused coupler, can be employed by twisting and fusing a single core optical fiber around the dual-core optical fiber at the output end of this dual-core fiber, thereby combining the two optical fields into the single core fiber, which can then be also now be spliced to a standard pigtailed photodetector.

The same fusion technique can be used to fabricate a dual core fiber out of a pair of standard single core fibers. Such a structure would be useful, for example, in order to generate a quadrature demodulator where the light passed along one fiber with the light passed along the other fiber, with the spatial fringe pattern beyond the cleaved face of the dual core fiber providing the readout of the phase variations.

DESCRIPTION OF PREFERRED EMBODIMENTS

In the usual situation, a typical optical fiber is fabricated as a filament of silica based material with the peripheral cladding having refractive index and the core having a higher index. In accordance with the present invention an optical fiber coupling device is made by twisting or otherwise placing in lateral contact a pair of optical fibers, heating the twisted together fibers above their melting point and drawing out the fibers to form a generally biconical taper at the union of the heated twisted fibers.

Figure 1:
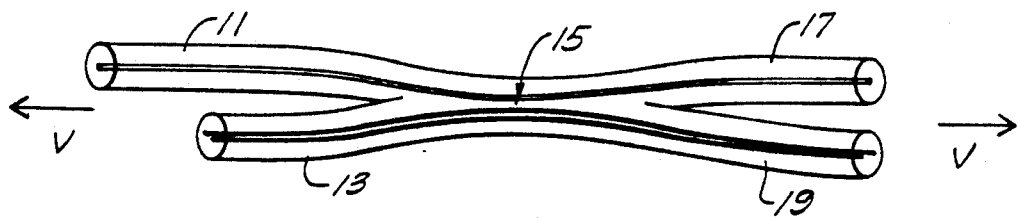
FIG. 1 is an illustration generally in diagrammatic form of a coupler constructed in accordance with the principles of this invention and in which a single core of fiber and a double core of fiber are fused together.

In FIG. 1 there is illustrated a coupler in which a single core optical fiber 11 has been fused and tapered with dual core optical fiber 13, providing two output fibers, a single core fiber 17 and a dual core fiber 19. The junction 15 was heated to the softening point (approximately 1600° C.) and the fibers were drawn by pulling in opposite directions to form the biconical taper illustrated. In the coupler of FIG. 1, there are then three cores passing through the junction and by appropriate adjustment of the length of the taper and the diameter of the taper the splitting ratio between each of the three cores is arbitrarily determined. During the heating and drawing process the splitting ratios may be controlled by monitoring the output signals from the dual core fiber 19 and the third core 17 (throughput). When the cores are spaced closely enough together, substantially 100% of the light in the single core fiber will be coupled into the dual core fiber. The split of this light between each of the cores in the dual core fiber can be varied from as much as substantially 100% throughput in the single core fiber, and zero in the other to any specific split between the cores. As the taper is drawn, coupling ratios vary periodically. This technique, then, allows for coupling of light output from a pigtail component into a dual core fiber without the previous requirement of bulk optics to provide such a coupling.

Figure 2:
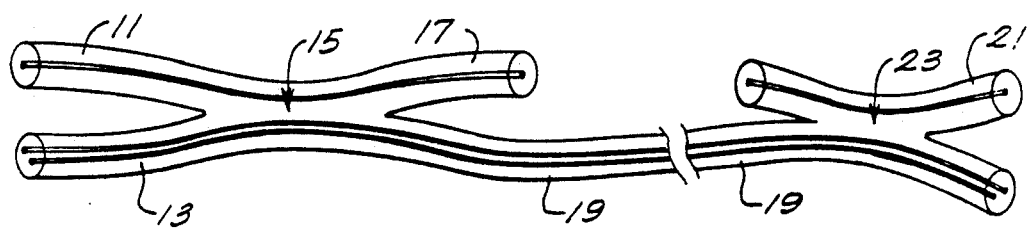
FIG. 2 is an illustration generally in diagrammatic form of the fused coupler of FIG. 1 and further including a second coupler providing a single core fiber output from the dual core fiber.

As illustrated in FIG. 2, a coupling device, similar to the device of FIG. 1 can be at the output of the dual core fiber, thereby effectively combining the optical outputs from each of the dual cores into a single core fiber, which may then be coupled to the standard fiber pigtail of a component, such as a photodetector or Integrated Optical Chip.

A device, as illustrated in FIGS. 1 and 2, can provide for an all fiber coupling system, rendering the system relatively free from problems arising from vibration, shock, temperature variation and other ambient environmental problems. Such couplers would find wide use in fiber optic sensors which employ dual core fibers.

Figure 3:
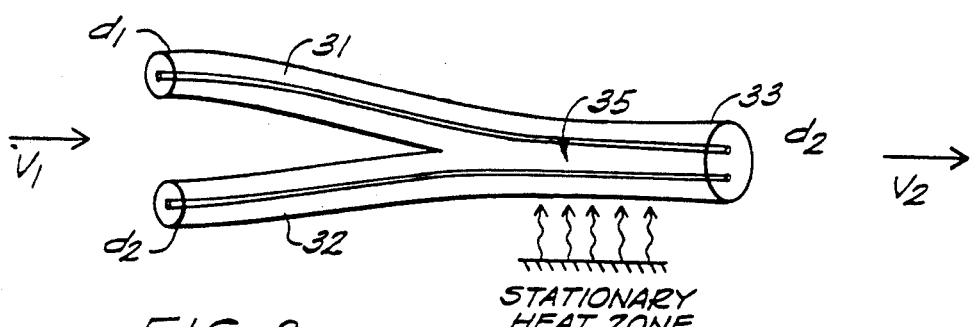
FIG. 3 is an illustration generally in diagrammatic form of an alternative embodiment in which two single core fibers are fused to form a dual core fiber.

In FIG. 3 there is illustrated a coupler in which two single core fibers 31 and 32 are positioned close together and fused to form a resultant dual core fiber 33. The single core fibers 31 and 32 are heated at a temperature above their softening point at the fusion area 35 and are down-tapered to a new diameter and into close proximity to form the dual core output face illustrated at 33. In the case of FIG. 3, it is simply a "breakout" device and no coupling occurs. The device is made by drawing the fibers in the same directions. As indicated, the diameters $d_1$, of the single core fibers 31 and 32 are less than the diameter, $d_2$, of the resulting dual core fiber 33. The ratio of these diameters is controlled by the draw velocities $V_1$ and $V_2$ of the material in the single core and dual core fibers respectively. $V_2$ must be greater than $V_1$ and in the same direction at high temperature to get a circular cross section, and by conservation of volume, the relationship between drawing velocities and diameters is $$V_2/V_1 = 2(d_1/d_2).$$

Figure 4:
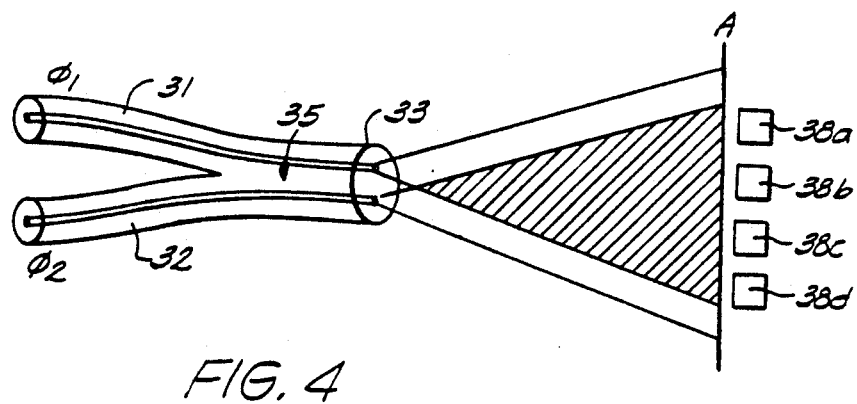
FIG. 4 is an illustration generally in diagrammatic form of a spatial demodulator employing the coupler of FIG. 3.

One application of the fused coupler of FIG. 3 is shown in FIG. 4. In FIG. 4 optical signals of different phase are introduced into the single core fibers 31 and 32 and the spatial interference pattern at plane A produced by the overlapping outputs from dual core face 33 is observed. The sinusoidal fringe spacing measured parallel to the end face far from the fibers is $$\Lambda \simeq \frac{\lambda S}{d}$$

with absolute position proportion to phase difference, where $\lambda$ is the wavelength of the light, S is the distance between the fiber face, and plane A, and d is the separation between the cores at the fiber end face. A segmented photodetector is used to measure the fringe pattern; if the geometry is properly chosen, photocurrents will be in quadrature i.e. proportioned to $\sin\phi$ and $\cos\phi$ wherein $\phi$ is the phase difference.

Another use that could be made of the coupler of FIG. 3 would be to provide an input at the dual core face 33 and, thus the single core fibers 31 and 32 would provide a breakout from the dual core fibers.

Figure 5:
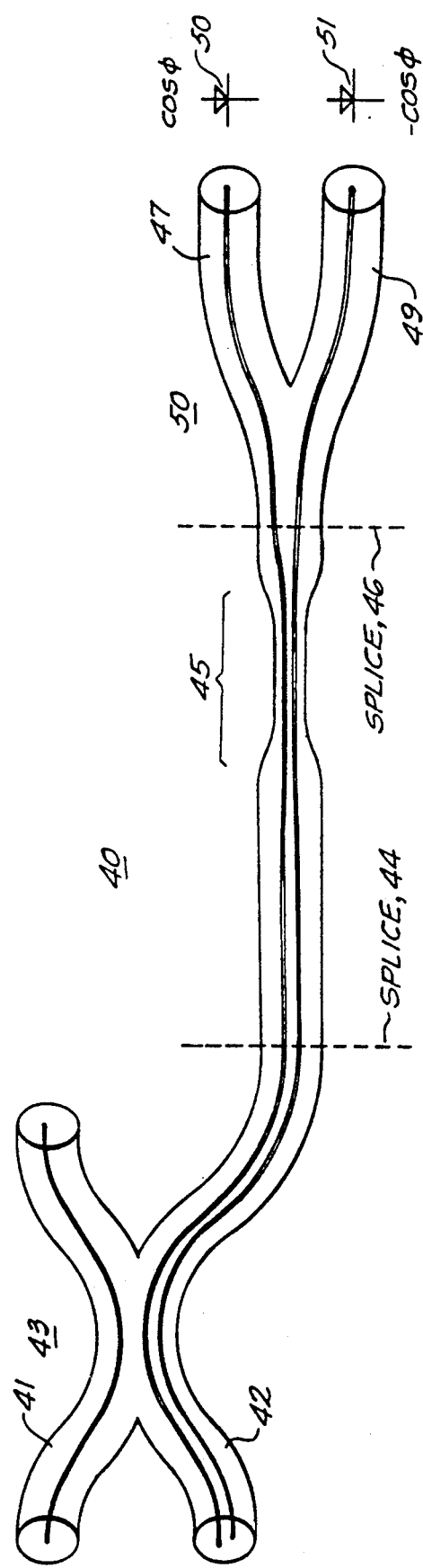
FIG. 5 illustrates in diagrammatic form another embodiment of this invention.

FIG. 5 illustrates another embodiment of this invention in which a single core fiber to dual core fiber coupler 43 is, as illustrated in FIG. 1, spliced to a dual fiber sensor 40 which is, in turn, spliced to a breakout device 50 as illustrated in FIG. 3. The sensor 40 includes a short tapered region 45 of dual core fiber which is tapered sufficiently to allow coupling to occur, resulting in interference between the light passing along the two fibers. The phase relationship at the output fibers are such that one fiber, 47 has an output represented by $\cos\phi$, where $\phi$ is the phase angle between outputs and the other has an output $-\cos\phi$. These outputs are detected at photodetectors 50 and 51.

Having described the invention, various modifications and other embodiments will occur to those skilled in the art.

What is claimed is:

1. A method for launching optical energy from one single core optical fiber into a dual core optical fiber having a generally circular cross section comprising the steps of
   a). placing in close juxtaposition a single core optical fiber and a dual core optical fiber and holding said fibers in lateral contact.
   b). heating said fibers to their softening point,
   c). drawing out said heated fibers to form a biconical taper at the union of said heated softened fibers, and
   d) adjusting the length and diameter of said tapers to achieve an arbitrarily selected optical splitting ratio among the three cores.

2. A method in accordance with claim 1 wherein said fibers are twisted together in step a.

3. A method in accordance with claim 1 wherein the light splitting ratios between said three cores are monitored during said heating and drawing steps and the variations in said ratios are used as a control for said heating and drawing process.

4. An optical fiber coupling device comprising a first optical fiber having a single core fused to a second optical fiber having dual cores, the fused junction being tapered, the taper length and diameter being controlled to provide for a selected splitting ratio between the dual cores of said second fiber for light coupled from said first fiber core.

5. A coupling device in accordance with claim 4 wherein substantially 50% of the light from said single core is coupled into each of the said dual cores.

6. An apparatus in accordance with claim 4 and further including a second coupling device comprising a third optical fiber having a single core fused to said second optical fiber at a position spaced apart from said first coupling device, said third optical fiber being fused with a taper such that substantially all of the light passing along said second fiber is coupled into said third fiber.

7. An optical fiber coupling device comprising a first optical fiber having a single core fused at a junction to a second optical fiber having a single core down tapered to an output fiber having a diameter different from the diameters of said first and second optical fibers, such that the output fiber from said junction is a dual core fiber of generally circular cross section.

8. A method for combining optical energy from a pair of single core optical fibers into a dual core optical fiber of generally circular cross section comprising the steps of,
   a). twisting together a pair of single core optical fibers, and
   b). heating said twisted together fibers to their softening point, drawing out said heated fibers with a controlled velocity in the same direction so that control of fiber diameters and core-core separation is such that the two cores are not coupled and form a dual core fiber of generally circular cross section.

9. A method in accordance with claim 8 wherein the velocity of drawing said single core optical fibers differs from the velocity of drawing of said dual core optical fiber, such that the diameter of the dual core fiber differs from the diameter of each of the single core fibers.

10. A method for spatially demodulating a pair of optical input signals differing in phase comprising the steps of;
 a). forming a fused junction by twisting together a pair of single core optical fibers,
 b). heating said twisted fibers together to their softening point,
 c). drawing out said heated fibers with different velocities in the same direction to form a down-taper at the union of said heated twisted fibers to form an output dual core fiber of different diameter than said pair of fibers,
 d). applying said differing phase optical input signals to each of said single core fibers, and
 e). measuring the fringe pattern at a plane receiving the light output from said dual core fiber end face as indicative of the demodulated value of said input signals.

11. A method in accordance with claim 10, wherein a segmented detector is placed at said plane to sense light impingement upon it to detect unambiguous phase information.

* * * * *